United States Patent
Yamaguchi et al.

[11] Patent Number: 5,764,815
[45] Date of Patent: *Jun. 9, 1998

[54] IMAGE COMMUNICATION APPARATUS

[75] Inventors: Yoshinori Yamaguchi, Yamato; Kenichiro Sugiura, Funabashi; Masanao Yasuda, Tokyo; Naoshi Inoue, Tokyo; Hideyuki Kobayashi, Tokyo; Michihei Murayama, Tokyo, all of Japan

[73] Assignee: Canon Kabushiki Kaisha, Japan

[*] Notice: The term of this patent shall not extend beyond the expiration date of Pat. No. 5,305,397.

[21] Appl. No.: 272,865

[22] Filed: Jul. 8, 1994

Related U.S. Application Data

[60] Continuation of Ser. No. 175,765, Dec. 30, 1993, abandoned, which is a division of Ser. No. 74,012, Jun. 9, 1993, Pat. No. 5,305,397, which is a continuation of Ser. No. 915,889, Jul. 20, 1992, abandoned, which is a continuation of Ser. No. 603,295, Oct. 25, 1990, abandoned, which is a continuation-in-part of Ser. No. 516,301, Apr. 30, 1990, abandoned.

[30] Foreign Application Priority Data

May 1, 1989 [JP] Japan .................. 1-112523
Oct. 8, 1990 [JP] Japan .................. 2-271215

[51] Int. Cl.$^6$ ....................... G06K 9/32
[52] U.S. Cl. ............. 382/297; 358/453; 345/126
[58] Field of Search .................. 382/46, 44, 41, 382/61, 296, 297; 358/453, 460, 530, 537, 538, 540; 345/126; 348/583

[56] References Cited

U.S. PATENT DOCUMENTS

| | | | |
|---|---|---|---|
| 4,168,488 | 9/1979 | Evans | 382/46 |
| 4,689,824 | 8/1987 | Mitchell et al. | 382/46 |
| 4,831,368 | 5/1989 | Masimo et al. | 340/720 |
| 4,947,344 | 8/1990 | Hayashi et al. | 364/518 |
| 5,038,393 | 8/1991 | Nanba | 382/61 |
| 5,305,397 | 4/1994 | Yamaguchi et al. | 382/46 |

*Primary Examiner*—Leo Boudreau
*Assistant Examiner*—Phuoc Tran
*Attorney, Agent, or Firm*—Fitzpatrick, Cella, Harper & Scinto

[57] ABSTRACT

There is disclosed an image communication apparatus, such as a facsimile apparatus, with function of displaying the received image. The apparatus is provided with a memory unit and a control unit, and is capable of storing the received image and displaying it upside down by the unit of a page, in order to facilitate the viewing of the image in case it is erroneously sent upside down.

4 Claims, 11 Drawing Sheets

INITIAL POINTER

INITIAL POINTER

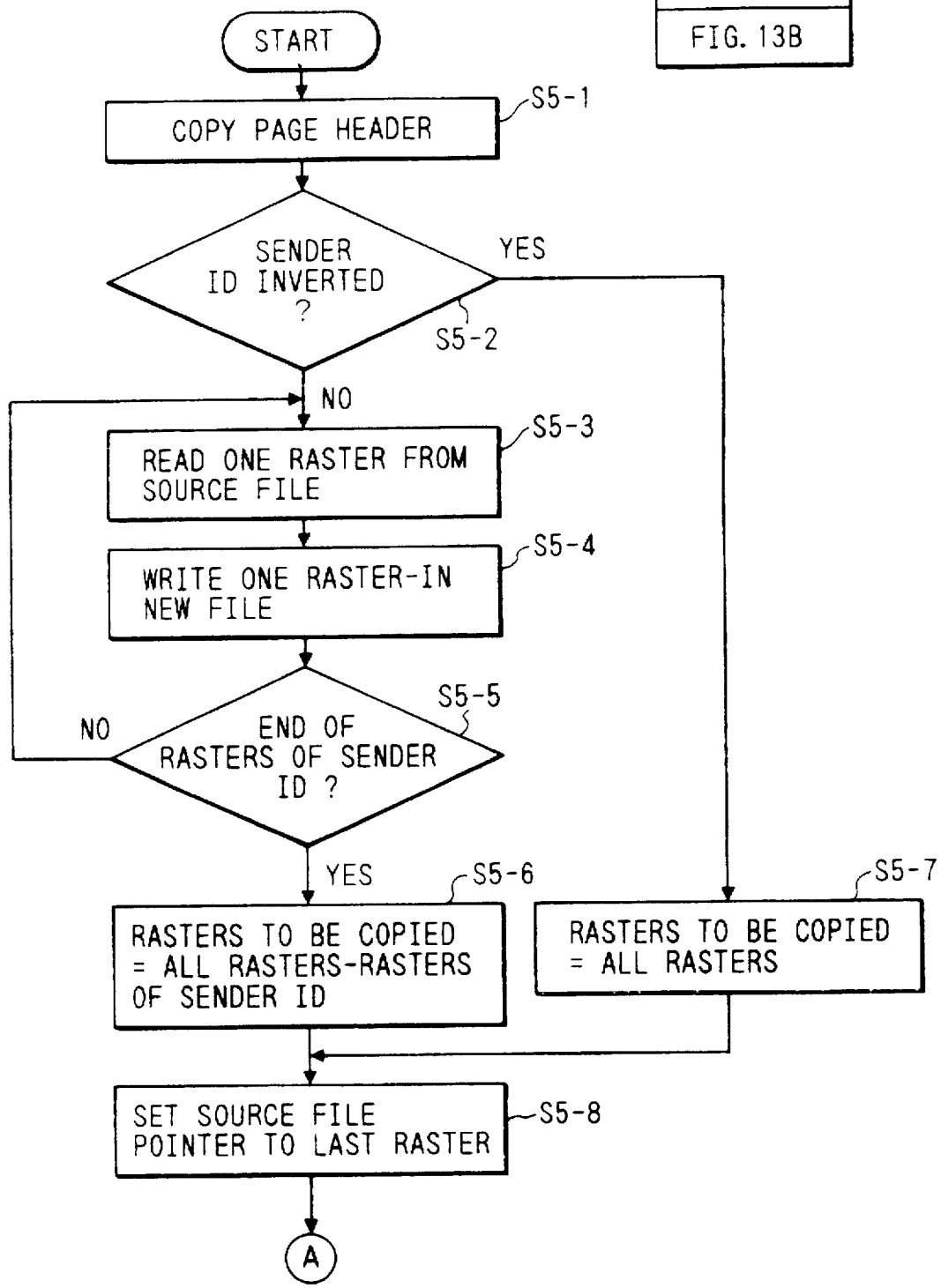

IMAGE COMMUNICATION APPARATUS

This application is a continuation of application Ser. No. 08/175,765 filed on Dec. 30, 1993, abandoned, which is a divisional of application Ser. No. 08/074,012 filed on Jun. 9, 1993, now U.S. Pat. No. 5,305,397, which is a continuation application of Ser. No. 07/915,889 filed on Jul. 20, 1992, abandoned, which is a continuation application of Ser. No. 07/603,295 filed on Oct. 25, 1990, abandoned, which is a continuation-in-part of application Ser. No. 07/516,301 filed on Apr. 30, 1990, now abandoned.

BACKGROUND OF THE INVENTION

1. Field of the Invention

The present invention relates to an image communication apparatus with function for displaying image information.

2. Related Background Art

As such a kind of apparatus, there is already known, for example, a facsimile apparatus, which has become rapidly popular as handy information transmitting means capable of directly printing the received image information.

Also there has already been commercialized a facsimile apparatus capable of storing the image information in an external memory or displaying it on a display unit such as a cathode ray tube instead of direct printing, such as a facsimile system utilizing a personal computer. Such facsimile apparatus will hereafter be called as software facsimile apparatus.

Such software facsimile apparatus is disclosed for example in the U.S. Pat. application Ser. Nos. 281,898 (Dec. 6, 1988), now U.S. Pat. No. 4,910,785, 267,732 (Nov. 3, 1988) and 150,659 (Jan. 13, 1988) now U.S. Pat. No. 4,922,349, and U.S. Pat. Nos. 4,827,349 and 4,829,385.

In the usual facsimile apparatus, an image eventually sent upside down does not cause a significant problem, since the received image is always printed on paper.

However, in the software facsimile apparatus explained above, since the received image is viewed on a display unit, an upside-down image is very difficult to observe and has eventually to be printed on paper.

SUMMARY OF THE INVENTION

In consideration of the foregoing, an object of the present invention is to provide an improvement on the image communication apparatus.

Another object of the present invention is to provide an image communication apparatus capable of displaying an upside-down image in an easily observable state.

Still another object of the present invention is to provide an image communication apparatus capable, in displaying an image received upside down, of displaying the received image in a vertically inverted state.

Still another object of the present invention is to provide an image communication apparatus capable, in displaying an upside-down image stored in a memory, of displaying said image in a vertically inverted state.

Still other objects of the present invention will become fully apparent from the following description of embodiments, to be taken in conjunction with the attached drawings.

DETAILED DESCRIPTION OF THE PREFERRED EMBODIMENTS

In the following there will be explained an embodiment of the present invention in detail, with reference to the attached drawings.

Figure 1:
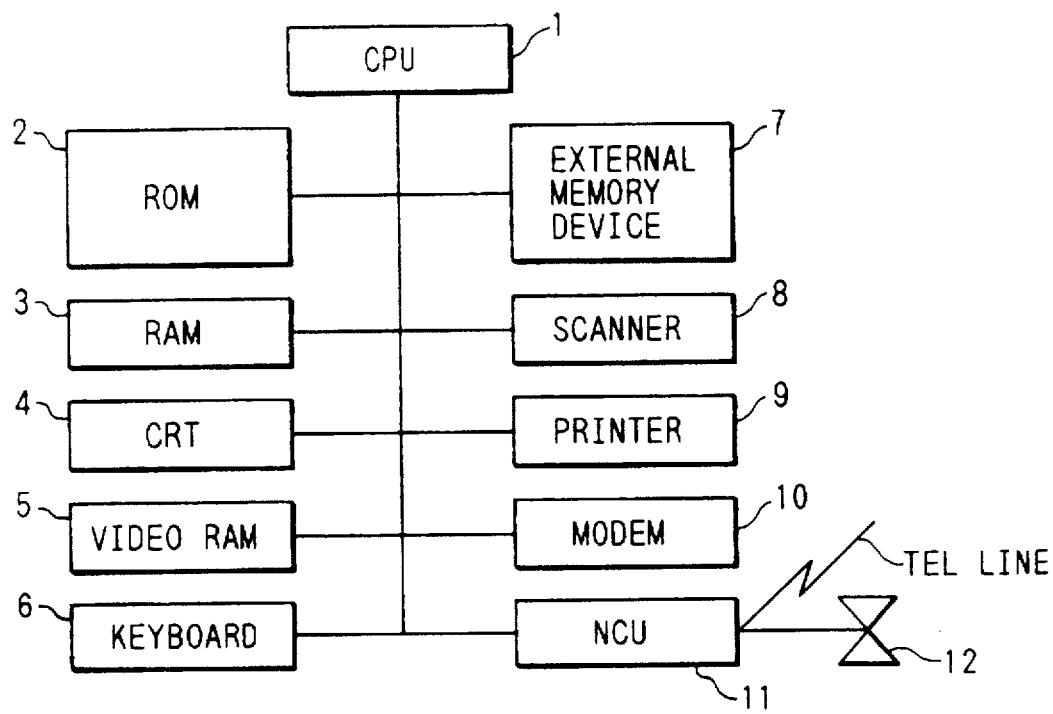
FIG. 1 is a block diagram of a facsimile apparatus constituting an embodiment of the present invention.

FIG. 1 is a block diagram of a first embodiment of the present invention applied to a facsimile apparatus.

The facsimile apparatus of the present embodiment is constructed as a software facsimile apparatus, and is provided with a central processing unit (CPU) 1 composed of a microcomputer and serving to control the entire apparatus; a read-only memory (ROM) 2 storing the control programs of said CPU 1; and a random access memory (RAM) 3 storing various data and programs.

Said facsimile apparatus is further provided with a cathode ray tube (CTR) 4 serving as a display unit; a video RAM 5 for said CRT 4; a keyboard 6 for entering various signals; an external memory 7 for storing the received image information; an image scanner 8 for reading an original image; a printer 9 for printing the received image information; a modem 10; a network control unit (NCU) 11; and a telephone set 12.

In said facsimile apparatus, the image information received through a telephone line is either directly printed by the printer 9, or stored in the external memory 7, according to a mode selected by the keyboard 6.

Figure 2:
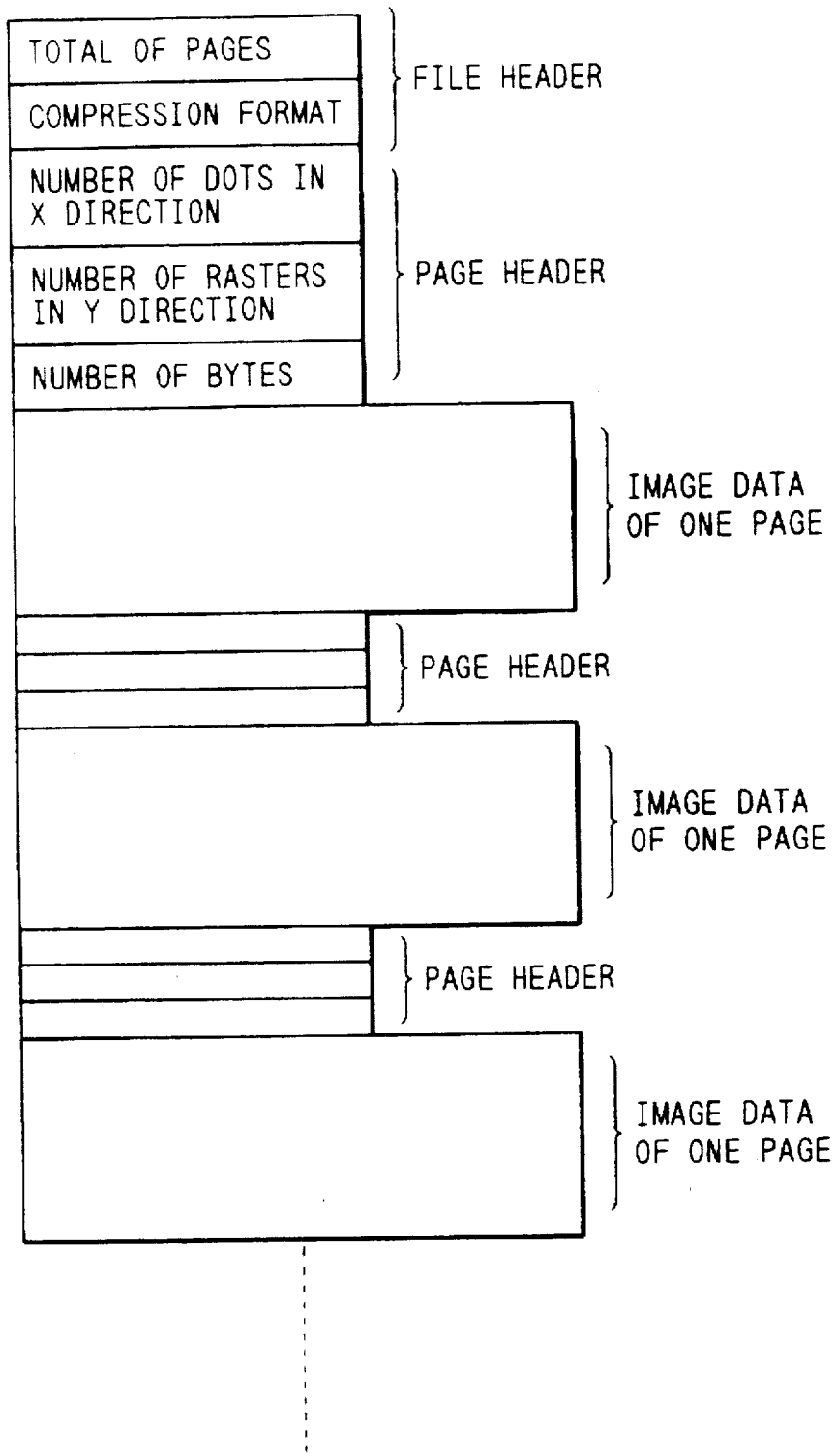
FIG. 2 is a view showing file format employed in case the received image information is stored in an external memory in said embodiment.

FIG. 2 is a schematic view of the file format in case said received image information is stored in the external memory 7.

At the start of each file stored in the external memory 7 there is provided a file header, storing data on the number of pages of said file and the method of compression. Though there are known various types of compression, such as MH (modified Huffman) method or MMR (modified modified Read) method, the storage of uncompressed original image data will be explained in the present embodiment, for the purpose of simplicity.

At the start of each page in each of the above-mentioned files, there is provided a page header storing data on the number of dots in the x-direction of the image, the number of rasters in the y-direction, and the number of bytes in a page.

In this facsimile apparatus, the operator can cause each page of the file stored in the external memory 7 to be displayed on the CRT 4, and, upon finding a vertically inverted page, can effect a vertical inverting process through the operation of the keyboard 6.

Figure 3:
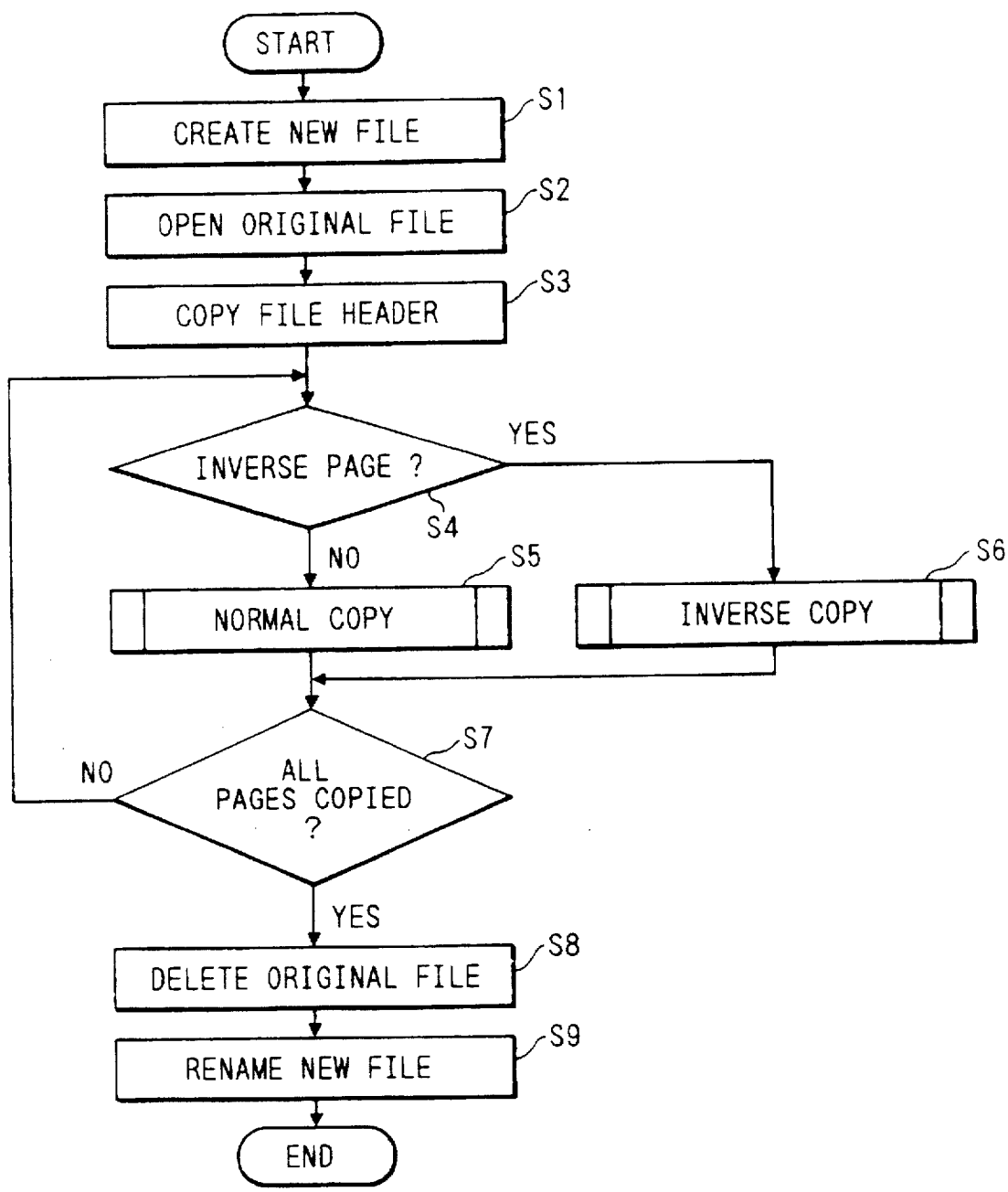
FIG. 3 is a flow chart of a main routine of vertical inverting process in said embodiment.

FIG. 3 is a flow chart showing the main routine of such vertically inverting process.

At first a new file is created (step S1), then the original file including a vertically inverted page is opened for enabling rewriting (step S2), and the file header of said original file is copied without change (step S3).

Then the pages of the file are displayed in succession. The operator observes the display of each page, and enters a copy command if the displayed page is not vertically inverted, or an inverted copy command if the displayed page is vertically inverted. The CPU 1 discriminates a copy command or an inverted command (step S4), and copies the image without change into the new file in case of a copy command (step S5), or stores an inverted image into the new file in case of an inverted copy command (step S6).

When all the pages are copied in this manner (step S7), the original file is deleted (step S8), and the above-mentioned new file is renamed to read as the same as the original file (step S9).

Figure 4:
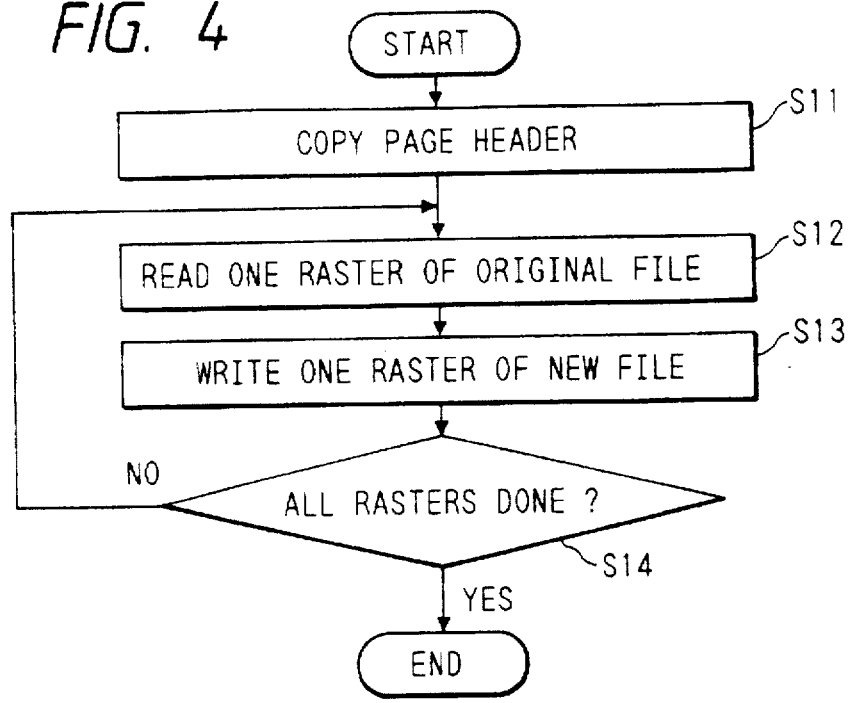
FIG. 4 is a flow chart of an operation for copying a non-inverted page in a new file in said embodiment.

FIG. 4 is a flow chart showing the process of copying a non-inverted page into the new file.

At first the page header is copied (step S11), then a raster of the original file is read (step S12) and written as a raster in the new file (step S13). When all the rasters are read and written in this manner (step S14), the sequence proceeds to a next page.

Figure 5:
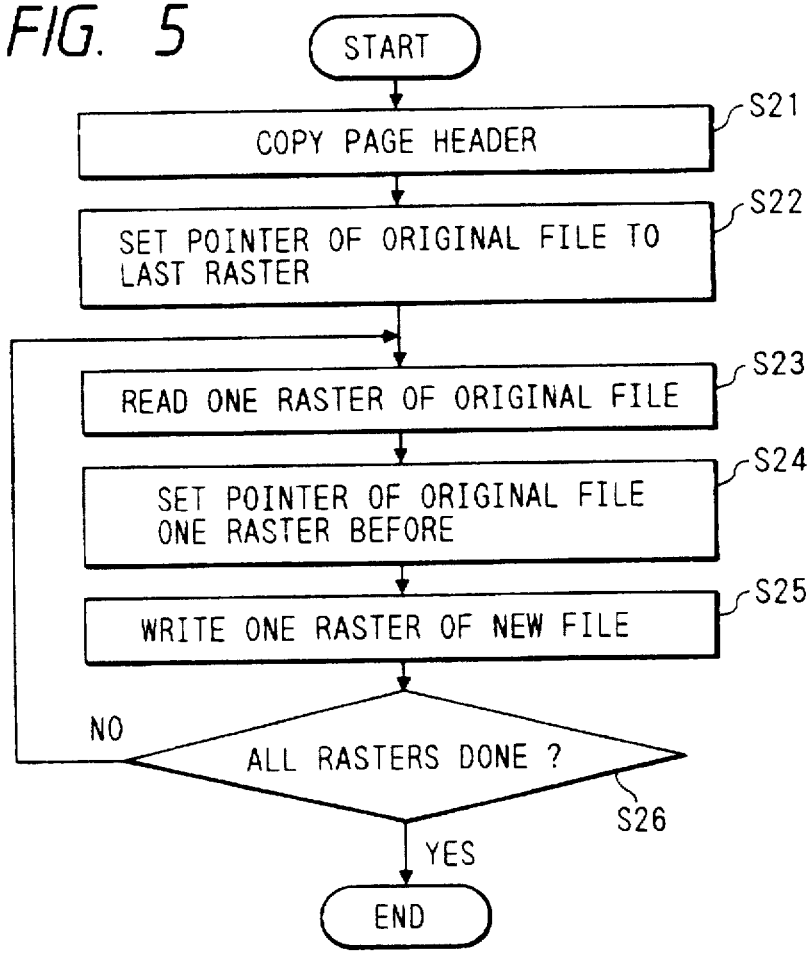
FIG. 5 is a flow chart of an operation for copying a vertically inverted page in a new file in said embodiment.

FIG. 5 is a flow chart showing the process of copying, with vertical inversion, an inverted page into the new file.

At first the page header is copied (step S21), and the pointer of the original file is set at the last raster (step S22). The last raster of the original file is read (step S23), then said pointer is moved to an immediately preceding raster (step S24), and the raster read in the step S23 is stored as a raster in the new file (step S25). After all the rasters are read and written in this manner (step S26), the sequence proceeds to a next page.

In the present embodiment, since the storage is conducted with the uncompressed original data, the number of bytes in a page remains unchanged after the inversion of the page. However, in case compressed data are employed, the number of bytes in a page may vary by data compression after inversion. In such case the content of the page header is changed after the copying of the page.

Figure 6:
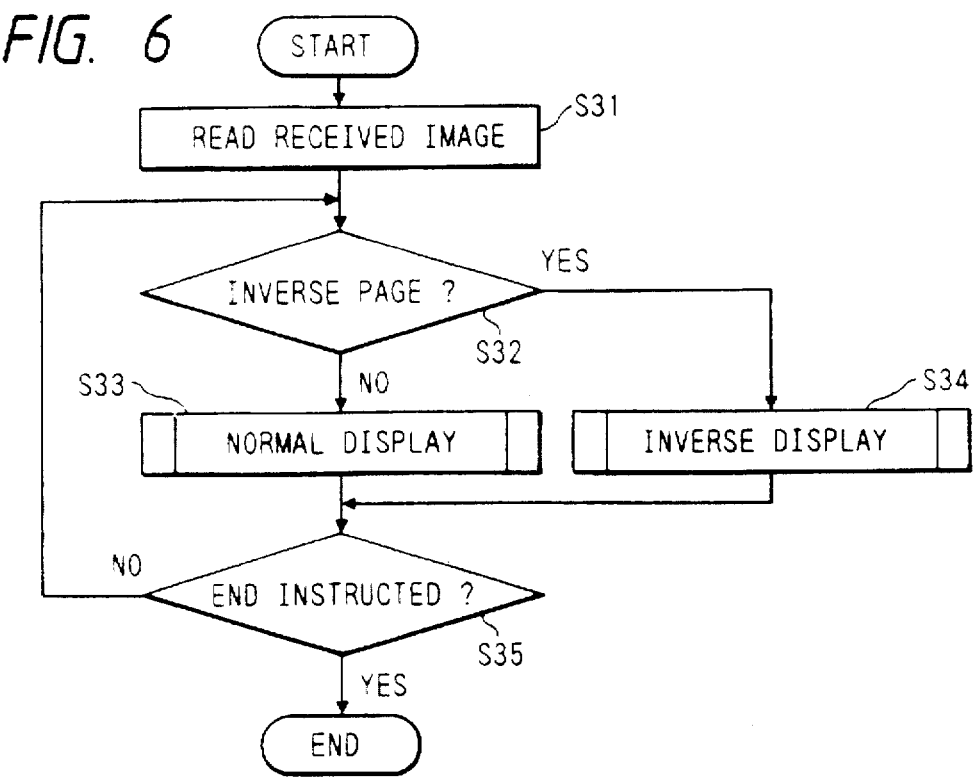
FIG. 6 is a flow chart of a main routine of vertical inverting process in a second embodiment.
Figure 7:
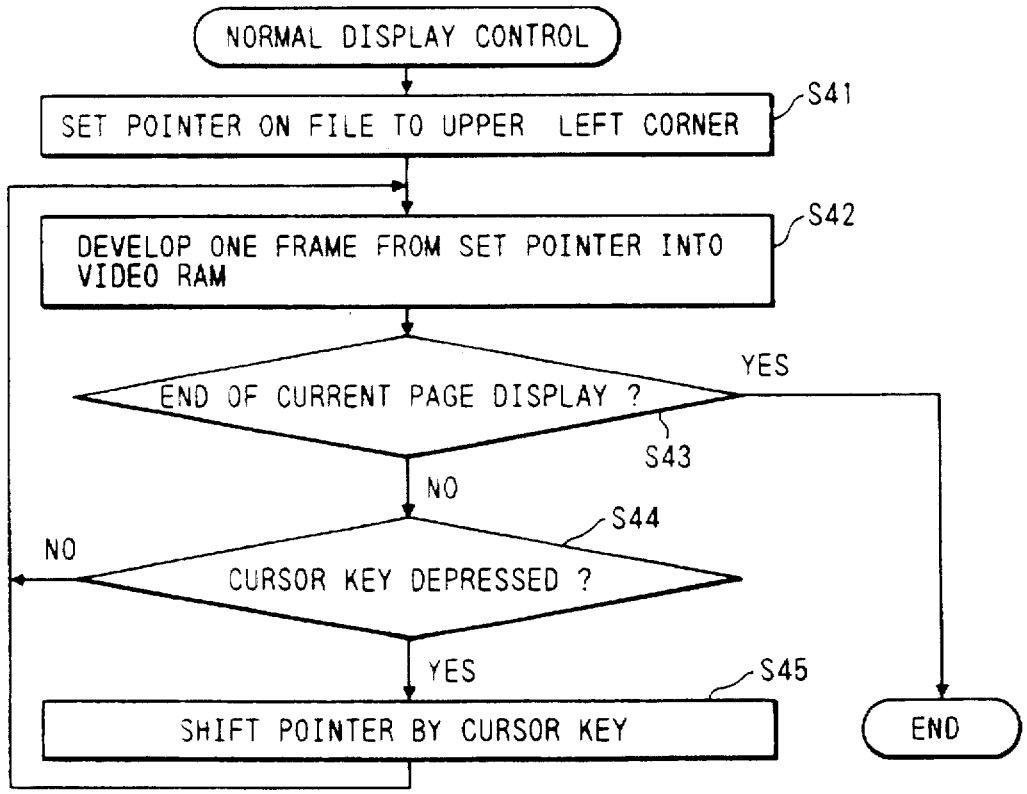
FIG. 7 is a flow chart of an operation for displaying a non-inverted page on a cathode ray tube in said second embodiment.
Figure 8:
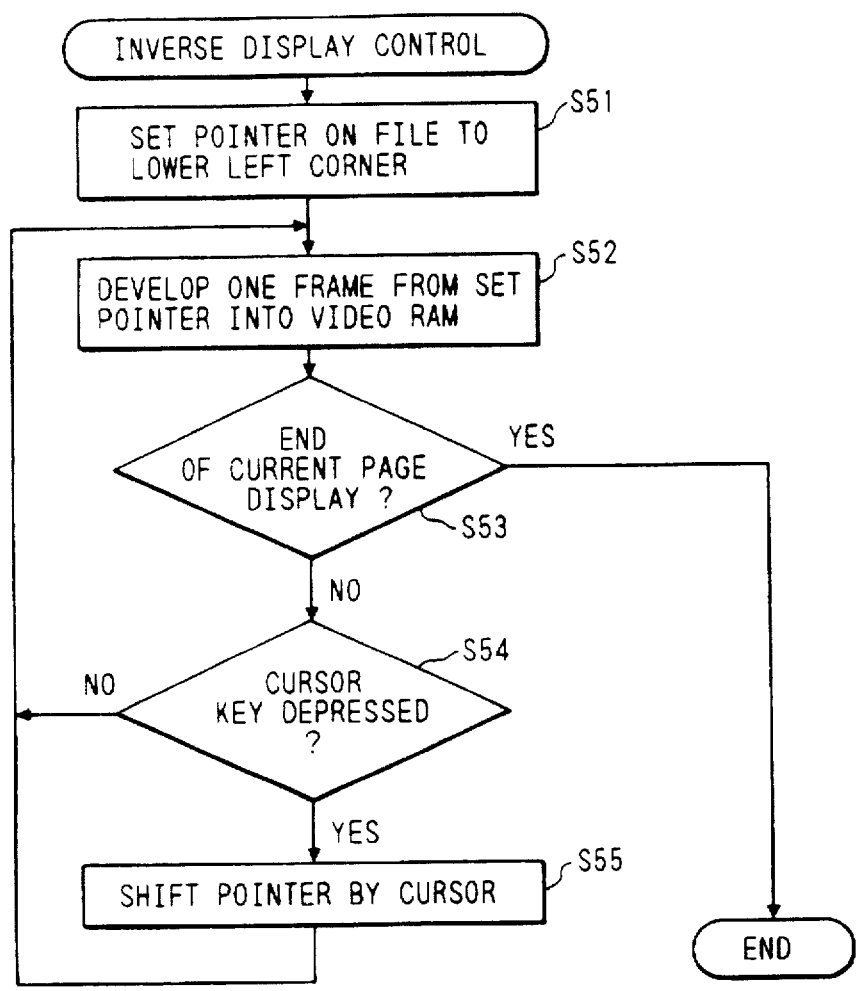
FIG. 8 is a flow chart of an operation for displaying a vertically inverted page on a cathode ray tube in said second embodiment.

FIGS. 6 to 8 are flow charts showing the operations in a second embodiment of the present invention.

In this embodiment, an inverted page is stored, after inversion, in the video RAM 5, and the content of said video RAM 5 is displayed on the CRT 4. The hardware structure and the file format are same as those shown in FIGS. 1 and 2.

Referring to FIG. 6, a desired file to be displayed on the CRT 4 is read out from the external memory 7 (step S31).

The pages of said file are displayed on the CRT 4 in succession (steps S32, S33). If there is an inverted page (step S32), a command is entered from the keyboard 6 to develop said page, with vertical inversion, on the video RAM 5, and the content of said video RAM 5 is displayed on the CRT 4 (step S34). The sequence is terminated in response to the entry of an end command from the keyboard 6 after the display of necessary images (step S35).

FIG. 7 is a flow chart showing a normal display process in the step S33 mentioned above.

Figure 9:
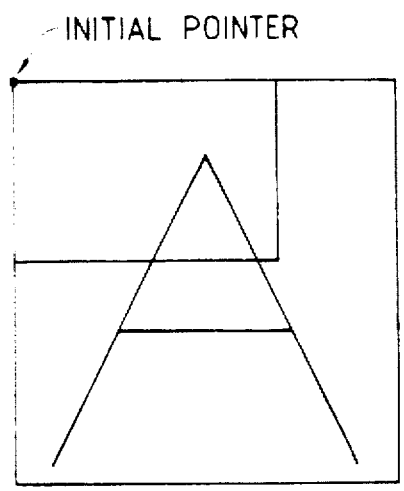
FIG. 9 is a schematic view showing the principle of process in FIG. 7.

At first the pointer on the file is set at the upper left corner of the page as shown in FIG. 9 (step S41), and an image frame starting from said pointer is developed on the video RAM 5 (step S42). Then the image developed on said video RAM 5 is displayed on the CRT 4. If the operator wishes to terminate the display of the page, a command is entered from the keyboard 6, thereby terminating the sequence (step S43). Otherwise, the display is maintained unless the cursor key is depressed (step S44). If the operator wishes to move the display, the cursor key is depressed to move the pointer (step S45), whereby the sequence returns to the step S42 for developing the image on the video RAM 5 anew.

FIG. 8 is a flow chart showing an inverted display process in the step S34 mentioned above.

Figure 10:
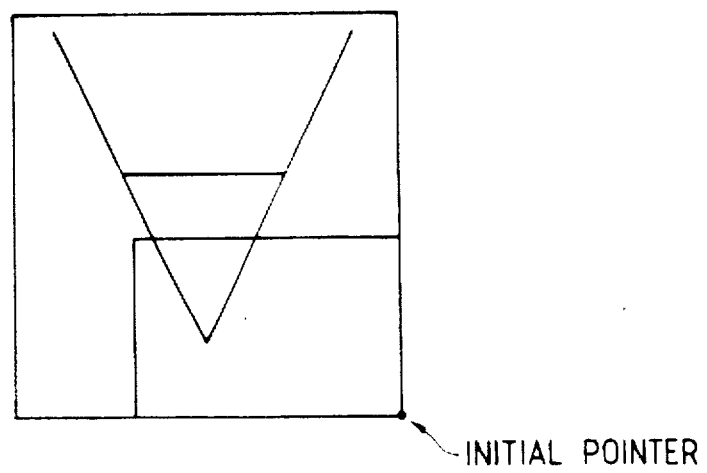
FIG. 10 is a schematic view showing the principle of process in FIG. 8.

In this case, the pointer on the file is set at the lower right corner of the page as shown in FIG. 10 (step S51), and an image frame is developed on the video RAM 5, raster by raster, from the lower right corner to the upper left corner (step S52). If the cursor key is depressed (step S54), the pointer is moved in a direction opposite to that of the cursor key (step S55), and the sequence returns to the step S52 for developing the image on the video RAM 5 anew.

As explained above, in the vertically inverted page, the initial setting of the pointer is made at the lower right corner of the page, and said pointer is moved in a direction opposite to that of the cursor key, whereby the image can be handled in the usual manner on the display.

Figure 11:
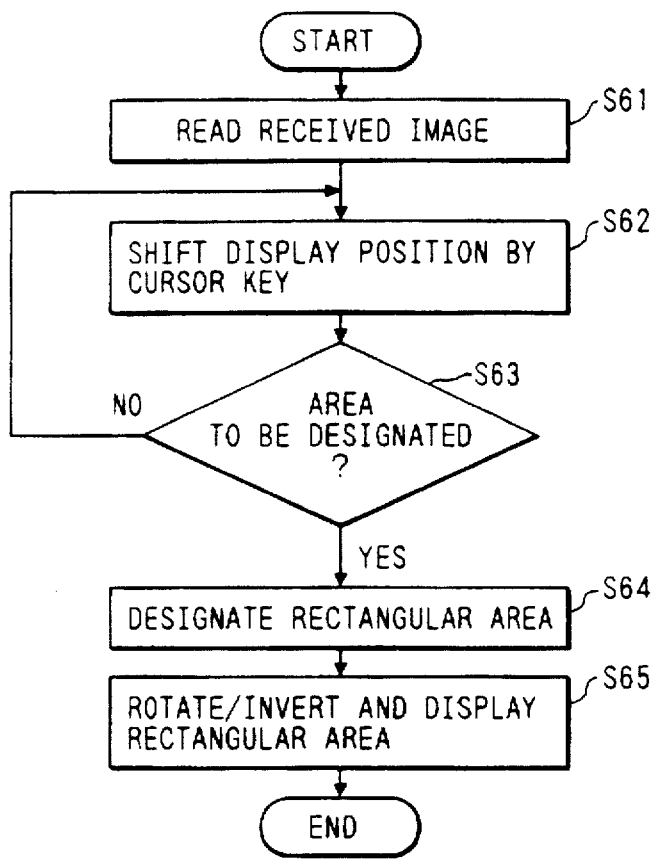
FIG. 11 is a flow chart showing the outline of function in a third embodiment of the present invention.
Figure 12:
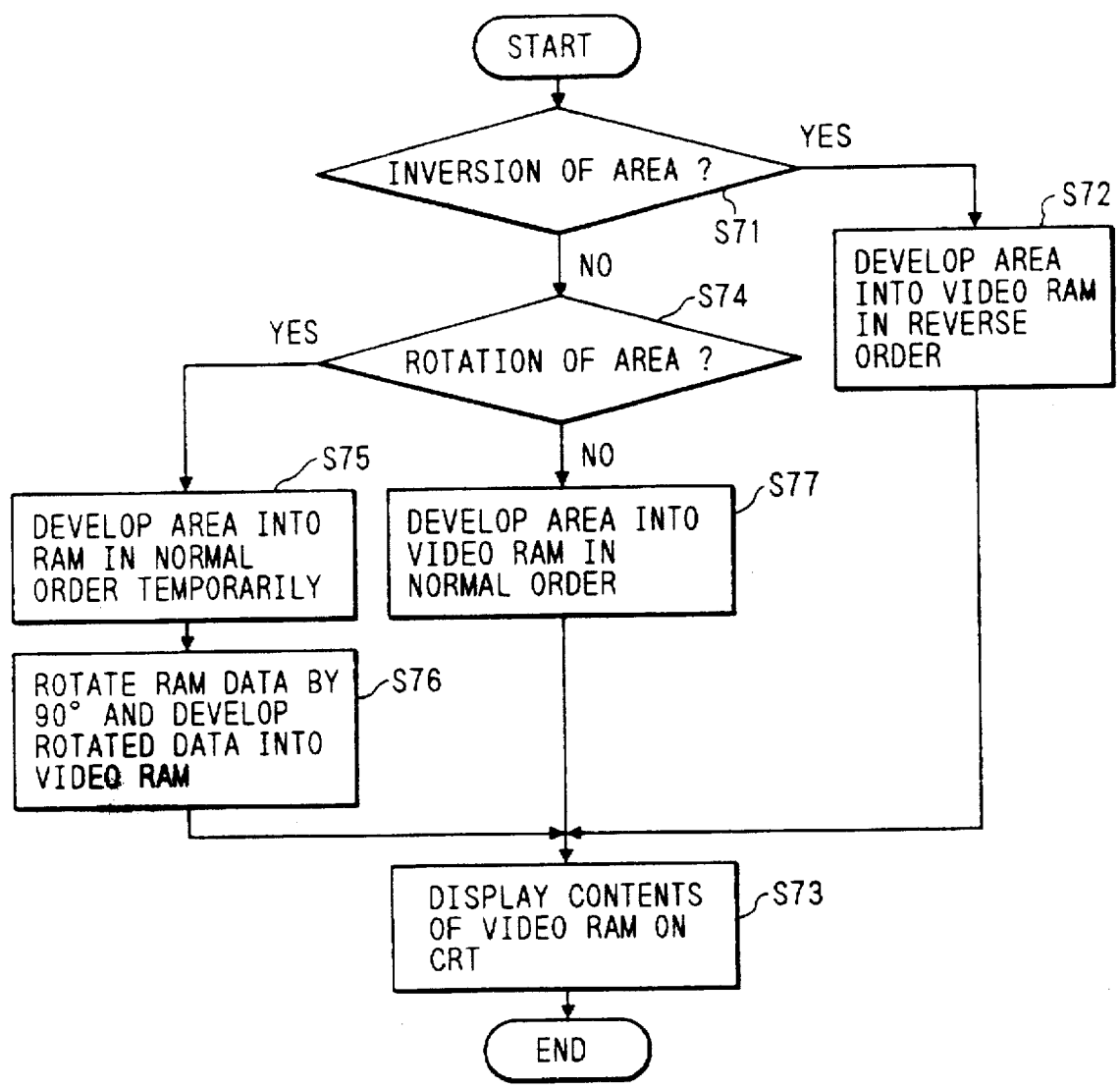
FIG. 12 is a flow chart for a process of vertical inversion or lateral rotation by 90° in a rectangular area in said third embodiment.

FIGS. 11 and 12 are flow charts showing the functions of a third embodiment of the present invention.

This embodiment is capable, in an original image containing plural areas which are inverted or laterally rotated, of obtaining a display in which said areas are properly aligned with other areas, by designating such inverted or 90° rotated areas with arbitrary rectangles and inverting or rotating such areas by 90°. The hardware structure and the file format of this embodiment are same as those shown in FIGS. 1 and 2.

Referring to FIG. 11, a file to be displayed on the CRT 4 is read from the external memory 7 and developed on the video RAM 5, and thus developed image is displayed on the CRT 4 (step S61). The operator moves the display position by observing the display and actuating the cursor key (step S62). If the display requires vertical inversion or 90° rotation (step S63), a rectangular area is designated by two diagonal points thereof indicated by the cursor (step S64). For the purpose of simplicity, in the present embodiment, said rectangular area is assumed to be of a size accommodatable in the image frame and of a square shape having same number of dots in the vertical and horizontal directions. Then the image of said rectangular area is displayed, after vertical inversion or 90° rotation, on the CRT 4 (step S65).

FIG. 12 is a flow chart showing the process of vertical inversion or 90° rotation of the rectangular area in the step S65 mentioned above.

At first, in case of the vertical inversion of a rectangular area (step S71), said rectangular area is developed on the video RAM 5 in a sequence opposite to the ordinary sequence (step S72), and is displayed on the CRT 4 (step S73).

In case of rotating the rectangular area to right or left by 90° (step S74), said rectangular area is developed in the ordinary manner on the RAM 3 (step S75), then the data on said RAM 3 are developed, with rotation to right or left by 90°, on the video RAM 5 (step S76) and then are displayed on the CRT 4 (step S73).

If the rectangular area is not inverted nor rotated to left or right, it is developed on the video RAM 5 (step S77) and displayed on the CRT 4 (step S73).

In the present embodiment, since the designated area is square with a same number of dots in the vertical and horizontal directions, the image after rotation can be easily fitted in the original area. However, it is also possible to process a rectangular area by designating two or more areas and rotating each area by 90°.

In the flow chart of FIG. 5, all of the vertically inverted pages are inverted. But, header information such as a sender ID automatically added at a sender end is not inverted (i.e. normal) in general even in such vertically inverted page. So, it may be preferable that the header information is not inverted while parts vertically inverted of the page are inverted. In this case, a flow chart shown in FIG. 13 in place of FIG. 5 is applied.

Figure 13B:
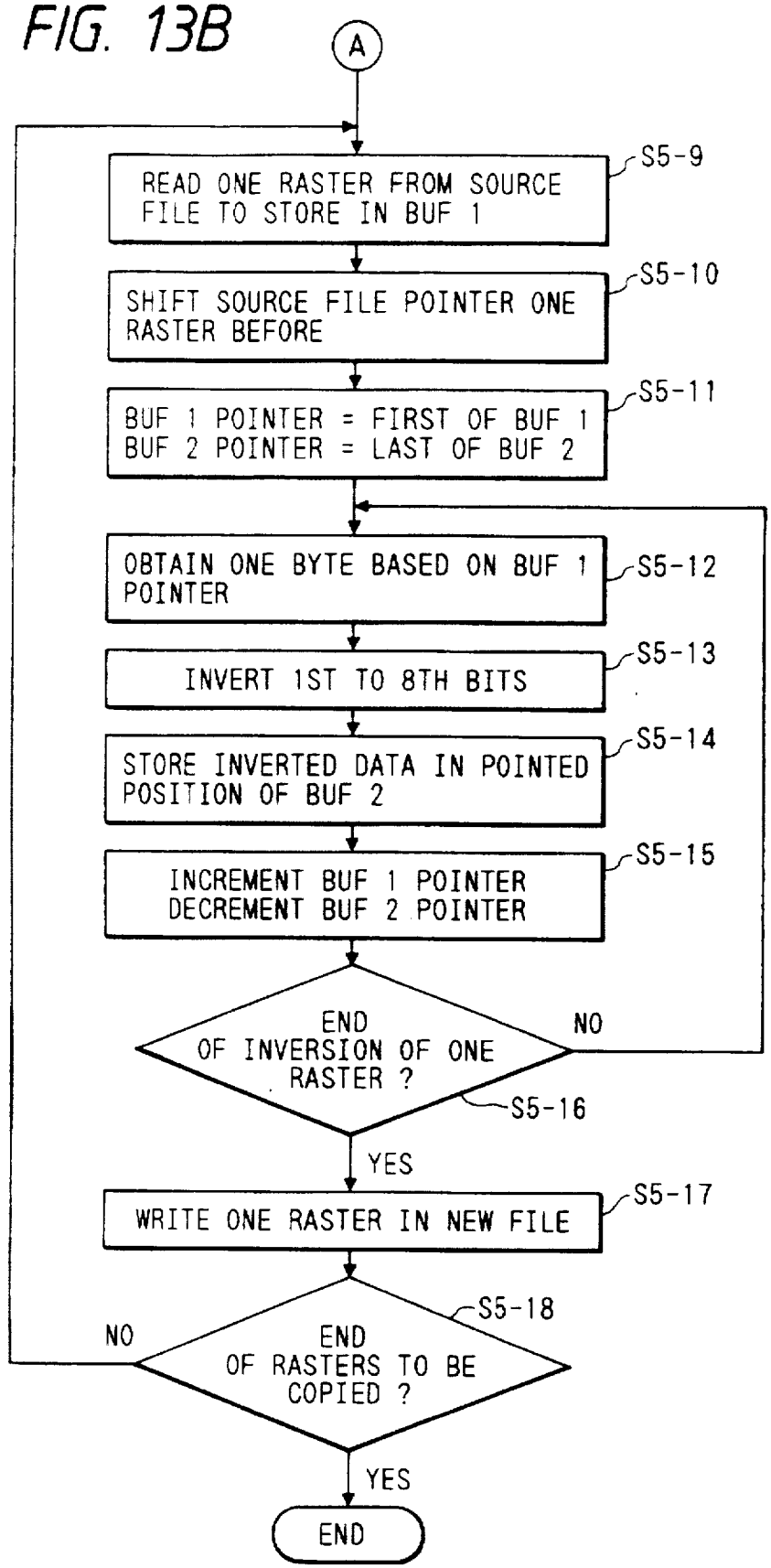
FIG. 13, consisting of 13A and 13B, is a flow chart for an operation for copying a partially inverted page in the embodiment of FIG. 5.

In reference to FIG. 13, at first a page header is copied (step S5-1) and it is checked whether a sender ID is inverted or not (step S5-2). If not, one raster is read from a source file (step S5-3) and is written as one raster of a new file (step S5-4). After this process is repeated at the number of times corresponding to rasters of the sender ID (step S5-5), the remainder obtained by subtracting the rasters of the sender ID from all the rasters is set as the value of rasters to be copied used in the next process (step S5-6). If the sender ID also is inverted, the number of all the rasters is set as the value of the copying rasters (step S5-7). Then a source file pointer is set to the last raster (step S5-8). One raster is read from a pointed position of the source file and stored in a buffer (referred to as BUF 1) of RAM 3 (step S5-9). After the source file pointer is shifted one raster before (step S5-10), a bit inversion process is executed.

A BUF 1 pointer is set to the head of BUF 1, and a pointer of a buffer (referred to as BUF 2) for storing therein raster bit-inverted sideward (or right and left) is set to the last of BUF 2 (step S5-11). One byte is obtained based on the pointer of BUF 1 (step S5-12) and the first- to the eighth- bits of the one byte are inverted (step S5-13) and stored in a pointed position of BUF 2 (step S5-14). Then the BUF 1 pointer is incremented and the BUF 2 pointer is decremented (step S5-15). The sideward inversion is repeated by one raster (step S5-16) and then the inverted raster is written as one raster of a new file (step S5-17). When rasters to be copied have been read and written (step S5-18), the next page is to be copied.

The above-explained embodiment allows, even when a vertically inverted image exists in the received image information, to display such image in an easily observable state by inversion.

The present invention is not limited to the foregoing embodiments but is subject to various modifications.

What is claimed is:

1. A facsimile apparatus comprising:

receiving means for receiving image information from a calling station, the image information including a calling station information area located in a predetermined location and a remaining area excluding the calling station information area, wherein the calling station information area and the remaining area may be received in respective different orientations, and wherein the calling station information area has a predetermined width defined by a first raster thereof as received;

storage means for storing the received image information;

nonrotatable visualizing means for visualizing the image information stored in said storage means; and control means for rotating the received image information of the remaining area without rotating the calling station information area, said control means being operative even when both the calling station information area and the remaining area are not designated manually, wherein said visualizing means visualizes the rotated image information and the calling station information as one image information.

2. An apparatus according to claim 1, wherein said control means inverts the remaining area to make a direction of the image information of the remaining area equal to that of the calling station information.

3. An image processing method comprising the steps of:

receiving image information from a calling station, the image information including a calling station information area located in a predetermined location and a remaining area excluding the calling station information area, wherein the calling station information area and the remaining area may be received in different respective orientations, and wherein the calling station information area has a predetermined width defined by a first raster thereof as received;

rotating the received image information of the remaining area without rotating the calling station information area in the predetermined location of the received image information, said rotating step being operative even when both the calling station information area and the remaining area are not designated manually; and visualizing calling station information and the rotated image information as one image information on nonrotatable visualizing means.

4. A method according to claim 3, wherein, in said rotating step, the remaining area is inverted to make a direction of the image information of the remaining area equal to that of the calling station information.

* * * * *